United States Patent [19]

Chihara et al.

[11] Patent Number: 4,720,518

[45] Date of Patent: Jan. 19, 1988

[54] COATINGS WHICH ARE ABRASION RESISTANT

[75] Inventors: Kohji Y. Chihara, Hudson; Hubert J. Fabris, Akron; Earl G. Melby; James L. Cowell, both of Uniontown; Harry W. Cocain, Cuyahoga Falls, all of Ohio

[73] Assignee: GenCorp Inc., Akron, Ohio

[21] Appl. No.: 22,182

[22] Filed: Mar. 5, 1987

[51] Int. Cl.$^4$ .................. C08K 5/54; C08L 43/00; B32B 27/24
[52] U.S. Cl. .................. 524/267; 524/264; 524/265; 524/266; 524/268; 524/506; 524/538; 525/440; 525/452; 525/453; 428/423.1; 428/423.9; 428/447; 428/474.4
[58] Field of Search ............. 524/264, 265, 266, 267, 524/268, 506, 538; 525/440, 452, 453; 428/423.1, 423.9

[56] References Cited

U.S. PATENT DOCUMENTS

| | | | |
|---|---|---|---|
| 4,572,871 | 2/1986 | Mabuchi | 428/423.1 |
| 4,572,872 | 2/1986 | Yamazaki | 428/423.1 |
| 4,640,950 | 2/1987 | Nishino | 524/265 |

*Primary Examiner*—Paul R. Michl
*Assistant Examiner*—Lee C. Wright

[57] ABSTRACT

Thermoplastic polymers or resins containing amide groups such as the nylons can readily be brominated or chlorinated in organic solvents to convert the (—NH—) units to (—NBr—) or (—NCl—) units and to form solutions of the N-brominated or N-chlorinated thermoplastic polymers or resins. These N-brominated or N-chlorinated thermoplastic polymer or resin solutions can be blended with silicones (siloxanes) and optionally with at least one finely divided material selected from the group consisting of inorganic and organic fillers and pigments and then can be coated on a cellular or solid rubbery hydrocarbon polymer substrate, such as an EPDM rubber in the form of a weatherstrip or glass run channel, dried and irradiated with ultraviolet light or heated at a temperature and for a period of time sufficient to reform the amide groups and to provide the rubbery substrate with an adherent and abrasion resistant coating which also exhibits a reduced coefficient of friction.

21 Claims, No Drawings

COATINGS WHICH ARE ABRASION RESISTANT

This invention relates to compositions useful for forming abrasion resistant coatings on rubbery substrates.

Automobile glass run channels used around automobile windows need high abrasion resistance against the sliding of the window glass edge. Low abrasion resistance can result in water leakage and freezing around the glass during cold weather.

Rubber weatherstrip materials used around doors and windows in automobiles also are subject to extensive wear. Abrasion of the automotive weatherstrip occurs in various areas around an automobile door opening, for example, in corner areas as the door is closed and in the lower areas of the door opening as a result of contact with the feet of passengers entering or leaving the automobile. This abrasion ultimately results in severe damage and failure of the weatherstrip.

An object of this invention is to avoid the difficulties alluded to above and to provide rubbery or rubber substrates with abrasion resistant coatings from thermoplastic polymers.

Another object of this invention is to provide a composition useful for forming abrasion resistant coatings on rubbery hydrocarbon polymer substrates.

These and other objects and advantages of the present invention will become more apparent to those skilled in the art from the following detailed description and working examples.

SUMMARY OF THE INVENTION

It has been found that solution of (I) amide group containing thermoplastic polymers or resins wherein the (—NH—) unit has become a (—NBr—) or (—N-Cl—) unit can be mixed in organic solvents with (II) at least one linear or branched organopolysiloxane or silicone compound which may be terminally saturated or terminally unsaturated and optionally with (III) at least one finely divided material selected from the group consisting of inorganic and organic fillers or pigments. The resulting composition or mixture when applied directly to a cured or vulcanized rubber substrate, e.g., an EPDM rubber, dried to remove the solvent and then exposed to ultraviolet radiation or heated at a temperature and for a period of time sufficient to remove the chlorine or bromine atoms from the nitrogen atoms and to reform the (—NH—) units to reproduce the amide group yields an adherent and abrasion resistant polymer or resin coating on the rubber substrate. In addition to an improvement in abrasion resistance the coating provides improvements in other properties such as the coefficient of friction. For example, the coating composition can be applied directly to EPDM automotive glass run channels as well as door weatherstrip sponge type gaskets to significantly improve the abrasion resistance without the need for napping or flocking.

Based on dry weight the coating or final coating on the substrate composition contains (I) about 100 parts by weight of the thermoplastic polymer or resin, (II) from 5 to 80 parts by weight of the siloxane or silicone and optionally (III) from 5 to 60 parts by weight of the finely divided inorganic or organic filler or pigment.

DISCUSSION OF DETAILS AND PREFERRED EMBODIMENTS

The amide group containing abrasion resistant thermoplastic polymer is selected from the group consisting of polyacrylamides, polyamideimides, polysulfonamides, polyurethanes, polyureas, polyurethaneureas and polyamides and mixtures of the same. These polymers are well known as shown by the "Encyclopedia Of Polymer Science And Technology," Interscience Publishers, a division of John Wiley & Sons, Inc., New York, Vol. 1 (1964), Vol. 10 (1969) and Vol. 11 (1969) and "Vinyl And Related Polymers," Schildknecht, John Wiley & Sons, Inc., New York, 1952. Of these N-containing thermoplastic polymers it is preferred to use the polyamides such as the nylons.

Examples of the nylons are those having long chains with recurring (—CONH—) groups as an integral part of the polymer chain. They are made by polyaddition of acrylamide, ring opening polymerization of, e.g., pyrrolidone, caprolactam and lauric lactam or by polycondensation of, e.g., aminononanoic acid, 11-aminoundecanoic acid, hexamethylene diamine with adipic or sebacic acid and p-phenylene diamine with terephthalic acid and the like and modifications of the same as illustrated by U.S. Pat. Nos. 4,414,362 and 4,448,956 and others. Mixtures of nylons can be used.

The thermoplastic (—CONH—) polymer to be brominated or chlorinated can be used in finely divided or pelletized form. If the thermoplastic is in massive form as obtained, it may be reduced in size using granulators, dicers, die face cutters, strand pelletizers, underwater pelletizers and so forth. If necessary, the thermoplastic may first be cooled or frozen to facilitate size reduction.

Various reagents and mixtures thereof can be used to brominate or chlorinate the thermoplastic (—CONH—) polymers including sodium hypobromite, hypochlorous acid, salts of hypochlorous acid (aqueous calcium hypochlorite or aqueous sodium hypochlorite (preferred)), alkyl hypochlorites (t-butyl hypochlorite), elemental bromine or chlorine, dibromomonoxide and dichloromonoxide. Aqueous solutions of hypobromous acid or hypochlorous acid and the like are preferably used for bromination or chlorination. These solutions are most conveniently obtained by addition of acids such as aqueous hydrobromic, hydrochloric (preferred), sulfuric or acetic acid to solutions of the sodium salts of hypobromic or preferably hypochloric acid.

The halogenation reaction is carried out in the presence of an organic solvent. This solvent has to be immiscible with water and inert under the reaction conditions; it has to dissolve the N-halogenated polymer with ease but not the original amide group containing polymer. Examples of solvents are methylene chloride (preferred), carbon tetrachloride, chloroform, tetrachloroethane, trichloroethane, benzene and toluene.

A preferred procedure for the preparation of the N-halogenated material used in the invention is to disperse the (—CONH—) polymer in a mixture of an aqueous solution of Na-hypochlorite (CHLOROX, 5.25% Na-hypochlorite) and the organic solvent ($CH_2Cl_2$) and add concentrated hydrochloric acid in a nearly stoichometric amount based on the Na-hypochlorite. The mixture is slurried at room temperature (ca 25° C.) or below until the polymer dissolves. The organic layer containing the desired product is separated and washed with water. The solution obtained can be used in the coating process directly or after appropriate dilution.

Or, a solid product can be obtained by solvent evaporation for easier shipment.

The brominated or chlorinated thermoplastic (—CONH—) polymer or mixture thereof is used in an amount of from about 1 to 50%, preferably about 2 to 4%, by weight solids in a solvent such as one or more of the above chlorinated hydrocarbons like methylene chloride for use as a coating material. A uniform application of the coating can be obtained with a low solids content solution.

The siloxane or silicone compound used with the halogenated polymer is at least one linear or branched (T-structure) siloxane or silicone compound which may be terminally saturated or terminally unsaturated. These polymers have the formula:

$$R''O(SiO)_n\begin{smallmatrix}R\\|\\|\\R^1\end{smallmatrix}$$

where R and $R^1$ may the same or different and are selected from the group consisting of H, —CH$_3$, —C$_2$H$_5$, —C$_3$H$_7$, —CH$_2$CH$_2$CF$_3$ and so forth, where R'' is selected from the group consisting of H,—Si(CH$_3$)$_3$, 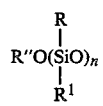

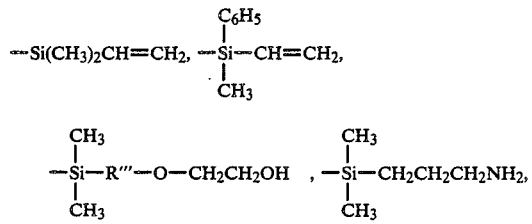

(where R''' is an alkylene group)

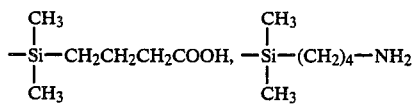

and the like and where n is a number. Examples of the siloxanes are trimethylsiloxy terminated polydimethylsiloxane, dimethylvinylsiloxy terminated polydimethylsiloxane, glycidyloxypropyl-branched T structure-trimethylsiloxy terminated polydimethyl siloxane, aminoalkyl-branched T structure-trimethylsiloxy terminated polydimethyl siloxane, acetoxy terminated polydimethyl siloxane and polymethylphenyl-diphenyl siloxane copolymer and the like and mixtures thereof. These siloxanes or silicones can be liquids, oils or greases and have a viscosity of from about 25 to 2,750,000, preferably from about 50 to 300,000, centistokes at 25° C. They should dissolve or disperse in the same solvent used to dissolve the brominated or chlorinated polymer. For information on silicones please see "Encyclopedia of Polymer Science And Technology," Volume 12, 1970, John Wiley & Sons, Inc., New York and Kirk Othmer, "Encyclopedia Of Chemical Technology," 3rd Edition, Volume 20, 1982, John Wiley & Sons, Inc.

The finely divided or powdered material is elected from the group consisting of inorganic or organic fillers or pigments and can have a particle size of from about 0.1 to 100 microns, preferably from about 2 to 70 microns. Silica can be used and can be a thermal or pyrogenic silica or a precipitated silica. Nylon can be used and can be any one of the nylons disclosed herein such as nylon 6, 6,6, 11, 12 and so forth. Carbon black, also, can be used in the coating composition. Divinylbenzene crosslinked polystyrenes and fluorocarbon resins such as polytetrafluoroethylene and the like can be used. Mixtures of the inorganic and organic fillers and pigments can be used. They are dispersed in the solvent used for the brominated or chlorinated thermoplastic polymer or resin.

The rubber substrate such as a weatherstrip or glass run channel and so forth can be a rubbery hydrocarbon polymer selected from the group consisting of natural rubber; high cis-polyisoprene; emulsion styrene-butadiene copolymers; solution styrene-butadiene copolymers which may be low vinyl, medium vinyl, high vinyl or high trans; solution BRs; butadiene- or isoprene-styrene star copolymers; block (thermoplastic elastomer) styrene-butadiene-styrene or styrene-isoprene-styrene copolymers; butyl rubber; high molecular weight polyisobutylenes; EPDMs (ethylene-propylene-nonconjugated diene copolymers) (preferred) and so forth and mixtures of the same. These polymers are well-known. These rubbery polymers are mixed with the usual curing and compounding agents for the particular polymers being used and cured or vulcanized. Examples of some agents are reinforcing blacks; silica; clay; TiO$_2$; stearic acid; zinc oxide; sulfur; dibenzo GMF with red lead or with peroxides; sulfur furnishing materials; retarders; accelerators; antioxidants; blowing agents like azodicarbonamide, p,p'-oxybis(benzenesulfonyl hydrazide) and dinitrosopentamethylene tetramine (preferred) and so forth. The rubber may be solid or blown (cellular—open or closed cell) depending on the ultimate use.

Ethylene-propylene-nonconjugated diene rubbery terpolymers (EPDMs) are made by the copolymerization of ethylene, propylene and a non-conjugated diene such as 1,4-hexadiene, ethylidene norbornene or dicyclopentadiene. They may be crystalline or non-crystalline and may be random, block or sequence terpolymers. Their relative unsaturation can vary from about 0.7 to 7.5. The mole % of ethylene can vary from about 50 to 85 and the raw (uncured and uncompounded) Mooney viscosity (ML 1+8 at 250° F.) can vary from about 14 to 84. Rubbery or elastomeric EPDM terpolymers, methods for making them and methods for curing them are shown by "Rubber Chemistry And Technology," Volume 45, No. 1, March, 1972, Division of Rubber Chemistry, Inc., American Chemical Society, pages 709 to 881; "Rubber Technology," 2nd Ed., Morton, Van Nostrand Reinhold Company, New York, 1973, Chapter 9; "Polymer Chemistry of Synthetic Elastomers," Part II, High Polymers Series, Vol. 23, John Wiley & Sons, Inc., New York, 1969, Chapter 7; "Encyclopedia Of Polymer Science and Technology," Interscience Publishers a division of John Wiley & Sons, Inc. New York, Vol. 6 (1967) pages 367–8 and Vol. 5 (1966) page 414 and "The Synthetic Rubber Manual," International Institute of Synthetic Rubber Producers, Inc., 10th Ed., 1986.

The coating composition can be applied to the rubbery substrate such as a weatherstrip or glass run channel using any conventional coating technique (brush, print roller, dip or spray). The coating may be applied to one side or to all sides. Generally, it is applied only to the side requiring improved abrasion resistance. After application to the substrate the solvent is evaporated leaving a film comprising N-brominated or N-chlorinated thermoplastic, silicone and optionally the finely divided pigment on the surface. By application of heat or UV irradiation the bromine or the chlorine is released from the nitrogen atoms and the (—NH—) units are reformed to provide the recurring amide groups. Some cross-linking may take place during this process. These treatments result in formation of strong, abrasion resistant and non-tacky coatings. Good adhesion to the rubber results since the N-brominated or N-chlorinated thermoplastic is a strong oxidizing agent which can react with the rubbery substrate generating polar groups on its surface and/or giving primary bonding between the rubber and the coating at the interface. The preferred method is to use UV treatment which is much faster and gives a consistant product. The irradiation with ultraviolet light should be done at wavelengths of not over about 375 nm, preferably not over about 350 nm (nanometer or millimicron). Other treatments may be effective in converting the N-brominated or N-chlorinated thermoplastic back to the amide form (e.g., treatment with steam, aqueous base and/or a solution of a reducing agent such as sodium bisulfite or sulfite). The heat treatment or other treatment is conducted for a period of time and at a temperature sufficient for complete conversion of the N-brominated or N-chlorinated units of the thermoplastic back to the amide NH form.

Although the working examples are directed mostly to improvement of the abrasion resistance of automotive and glass run channel, the coating material may be useful to improve the abrasion resistance and reduce the surface friction of other substrates such as windshield wipers, vinyl films, upholstery, luggage and so forth.

The following examples will serve to illustrate the present invention with more particularity to those skilled in the art.

EXAMPLE 1

Into a 2-liter reaction flask equipped with an air-driven stirrer was placed nylon 6 powder (30 g, prepared by grinding in a Wiley mill and passing through a 10 mesh screen), CHLOROX (750 g, 5.25% aqueous solution of sodium hypochlorite), conc. HCl (51 g) and methylene chloride (791 g=600 ml). The mixture was stirred for 30 minutes and poured into a separatory funnel. The bottom (methylene chloride) layer was separated, washed with 1.5 liters of water, and poured into about 500 ml of hexane to precipitate N-chlorinated nylon 6 (41 g) with chlorine content of 25.9% (c.f. theoretical chlorine content in the case of all nitrogen atoms being chlorinated, 23.8%). Finely divided nylon 6,6, nylon 11, nylon 12 and a polyurethane also were chlorinated in similar ways as described above.

Nylon 6 is a type of nylon made by ring opening polymerization of epsilon caprolactam. Nylon 6,6 is a type of nylon made by condensing hexamethylene diamine with adipic acid. Nylon 11 is a type of nylon derived from 11-aminoundecanoic acid. Nylon 12 is a type of nylon made by the polymerization of lauryl lactam (dodecanoic lactam) having 11 methylene groups between the linking (—CONH—) groups in the polymer chain. The polyurethane was the reaction product of adipic acid, a polyetherglycol and diphenylmethane-4,4'-diisocyanate.

EXAMPLE 2

4% methylene chloride solutions of the N-chlorinated nylons and the polyurethane with or without 10% by weight (based on the N-chlorinated materials) of silicone oil (50 centistrokes, trimethylsiloxy-terminated polydimethyl siloxane) were sprayed onto vulcanized EPDM rubber extrudate (solid) sheets. The coated sheets were air-dried overnight to eliminate the solvent (methylene chloride), treated for 5 minutes at 110° C. in an oven to melt the coating layer and passed 3 times under three high-pressure mercury lamps (UV) (200 Watts/inch, 10 inches long) for a total exposure of about 7.5 seconds to cure the coating (dry thickness 15–20μ). After one day for maturation and, also, to evolve residual chlorine, each of the coated sheets was tested on a glass edge scuff type abrasion tester equipped with a ground-glass abrasion tool. Addition of the silicone oil improved the abrasion resistance as shown in Table I, below, where the number of cycles of the glass edge sliding (1 kg load) used to abrade the coating layer to expose the EPDM extrudate substrate is listed.

TABLE I

| Silicone Oil | Abrasion Resistance (Cycles) | | | |
| --- | --- | --- | --- | --- |
| | N—chlorinated Nylon 6* | N—chlorinated Nylon 6,6* | N—chlorinated Polyurethane* | N—chlorinated Nylon 11* |
| None | 260 | 296 | 6 | 50 |
| 10% | 865 | 807 | 807 | 2,000 |

*After irradiation, the —NCl— units of the chlorinated nylons and urethane had been reformed to(—NH—) units.

The EPDM used was a carbon black reinforced compounded and sulfur vulcanized, non-staining and random ethylene-propylene-ethylidene norbonene terpolymer.

For more information on the bromination or chlorination of thermoplastic polymers having (—NH—) units and to convert the (—NBr—) or (—NCl—) units back to (—NH—) units see copending patent application of Hubert J. Fabris et al, U.S. Ser. No. 832,281, filed Feb. 24, 1986 and entitled "Abrasion Resistant Coatings," the disclosure of which is incorporated herein and made a part hereof by reference to the same.

EXAMPLE 3

A mixture of N-chlorinated nylon 11 (1 g), silica micropowder (fumed silica, particle diameter 2–10μ, 0.1 g), methylene chloride (24 g) and various amounts of the silicone oil (same as in Example 2, above) was applied to the same type of vulcanized EPDM rubber extrudate sheet, processed and tested in the same way as described in Example 2, above. The abrasion resistance varied with the silicone oil as shown in Table II, below:

TABLE II

| | Abrasion Resistance | |
| --- | --- | --- |
| Silicone Oil (% of nylon weight) | Silica Micropowder (% of nylon weight) | Cycles |
| 0 | 0 | 50 |
| 0 | 10 | 240 |
| 5 | 10 | 2,000 |
| 10 | 10 | 4,300 |
| 20 | 10 | 4,600 |
| 30 | 10 | 43,300 |

EXAMPLE 4

A mixture of N-chlorinated nylon 11 (4 g), silica micropowder (same as in Example 3, above) (0.4 g), various amounts of dimethylvinylsiloxy-terminated polydimethyl siloxane (100 centistokes) and methylene chloride (96 g) was applied to the same type of vulcanized EPDM rubber extrudate sheet and processed in the same way as described in Example 2. Each of the coated sheets was tested in a crock meter abrasion tester [a glass edge with 3 kg load sliding at 66 Hz on the test specimens (flat sheets)]. The abrasion resistance varied with the level of vinyl group-terminated polydimethyl siloxane as shown in Table III, below. The cycle numbers in Table III cannot be directly compared to those in Table I or Table II, because the test methods are different.

TABLE III

| Abrasion Resistance | | |
|---|---|---|
| Silicone Oil (% of nylon weight) | Silica Micropowder (% of nylon weight) | Cycles |
| 0 | 10 | 201 |
| 10 | 10 | 929 |
| 20 | 10 | 1,229 |
| 30 | 10 | 2,903 |

EXAMPLE 5

A mixture of N-chlorinated nylon 11 (3 g), the above trimethylsiloxy-terminated silicone oil (1.2 g), the above dimethylvinylsiloxy-terminated silicone oil (0.8 g), the above silica micropowder (0.4 g) and methylene chloride (97 g) was applied to a sample of the same type of extruded and vulcanized EPDM rubber sheet, processed and tested as shown in Examples 2 and 4, above.

The crock meter abrasion resistance was 6,144 cycles.

EXAMPLE 6

A mixture of N-chlorinated nylon 11 (3 g), the above trimethylsiloxy-terminated silicone oil (1.2 g), the above dimethylvinylsiloxy-terminated silicone oil (0.8 g), nylon 11 micropowder (average particle diameter of about 70μ) (0.8 g) and methylene chloride (97 g) was applied to a sample of the same type of vulcanized EPDM rubber sheet, processed and tested as shown in Examples 2 and 4, above.

The crock meter abrasion resistance was 4,975 cycles.

EXAMPLE 7

A mixture of N-chlorinated nylon 11 (2 g), the above trimethylsiloxy-terminated silicone oil (0.6 g), the above dimethylvinylsiloxy-terminated silicone oil (0.4 g), the above silica micropowder (0.1 g), the above nylon 11 micropowder (0.2 g), thermal carbon black ASTM N-990 (0.025 g) and methylene chloride (48 g) was applied to a sample of the same type of vulcanized EPDM rubber formed as a glass run channel (shaped for use). It was processed and tested as shown in Examples 2 and 4, above.

The crock meter abrasion test was stopped at 10,000 cycles. The coating layer did not show any abrasion after the test.

The N-chlorinated nylon 11 is readily soluble in methylene chloride and the resulting composition can be applied directly to the EPDM. Unmodified nylon 11, on the other hand, is only soluble in solvents such as formic acid and meta-cresol which are not suitable for coating applications.

EXAMPLE 8

A mixture of N-chlorinated nylon 12 (4 g), the above trimethylsiloxy-terminated silicone oil (0.8 g), the above dimethylvinylsiloxy-terminated silicone oil (1.2 g), ASTM N-990 carbon black (0.1 g), the above silica micropowder (0.4 g), and methylene chloride (96 g) was applied to a sample of the same type of vulcanized EPDM rubber formed as a glass run channel, processed and tested as shown in Examples 2 and 4, above.

The crock meter abrasion resistance was 17,000 cycles.

EXAMPLE 9

The same coating composition as described in Example 6, above, was applied to the sponge part of cured EPDM rubber weatherstrip to give a 2–3μ (dry thickness) layer. After overnight drying, the coated weatherstrip was passed under the foregoing UV lamp system 3 times for about 2.5 seconds each time.

After one day maturation, the coating layer was tested on a Wyzenbeek abrasion tester and showed no abrasion after 100,000 cycles. The coated weatherstrip had a friction coefficient (Fisher Body specification test) of 0.21. Uncoated weatherstrip showed Wyzenbeek failure and abrasion of less than 20 cycles and friction coefficient of only 1.7.

The cellular or sponge part of the EPDM weatherstrip was blown during the vulcanization step with dinitrosopentamethylene tetramine.

EXAMPLE 10

A 4% methylene chloride solution of N-chlorinated nylon 11 (50 g) and trimethylsiloxy-terminated polydimethyl siloxane (viscosity 300,000 centistokes, 1.0 g) was applied to an uncoated cured EPDM rubber glass run channel. The coating was processed and tested in the same way as described in Example 4 except that the coating was cured by passing it 5 times under a medium-pressure mercury lamp system.

The crock meter abrasion resistance was greater than 25,000 cycles.

EXAMPLE 11

A 4% methylene chloride solution of N-chlorinated nylon 11 (50 g), trimethylsiloxy-terminated polydimethyl siloxane (viscosity 2,500,000 centistokes, 1.0 g), carbon black (0.3 g), silica micropowder same as above and nylon 11 powder same as above (0.2 g) was applied to an uncoated cured EPDM rubber glass run channel. The coating was processed and tested in the same way as described in Example 4.

The crock meter abrasion resistance was greater than 10,000 cycles.

EXAMPLE 12

Into a quart reaction bottle was placed nylon-6/9 pellets (Aldrich) 10 g, CHLOROX 214 g, methylene chloride 264 g (200 ml), and conc. HCl 14.4 g. The mixture was stirred with a magnetic stirrer for 2 hours at about 0° C. N-chlorinated nylon-6/9 was separated and purified in the same way as shown in Example 1. N-chlorinated nylon-6/10 and -6/12 were prepared in a similar way. Separate solutions of 4% methylene chloride solutions of N-chlorinated nylon-6/9, -6/10, and -6/12 each containing 30% (by N-chlorinated nylon weight) of trimethylsiloxy-terminated polydimethylsiloxane (300,000 centistokes) were applied to uncoated cured EPDM rubber glass run channels. The coatings were air-dried overnight, melt-heated in an oven for 5 minutes at 50°–60° C. and passed 5 times under a medium pressure mercury lamp system (3 Sylvania-made H2200T4/24Q) at 50 feet/min. The crock meter abrasion resistance of the coatings were 3,800, >25,000, and 25,000 cycles for N-chlorinated nylon 6/9, 6/10, and 6/12, respectively. Nylon 6/9 is poly (hexamethylene nonanediamide). Nylon 6/10 is poly (hexamethylene sebacamide). Nylon 6/12 is poly (hexamethylene dodecanediamide).

EXAMPLE 13

A mixture of 2 grams of N-chlorinated nylon 6/10, 0.2 g of trimethylsiloxy-terminated polydimethylsiloxane, 48 g of methylene chloride and 0.2 g each of powdered Nylon 11 about 70 microns particle diameter, TEFLON (400 mesh), 2%-divinylbenzene-crosslinked polystyrene (200–400 mesh), Degussa-TS-100 (silica), "Cabosil" N70-TS (fumed colloidal silica), and carbon black (Raven 450, Columbia Co.) was applied to uncoated cured EPDM rubber glass run channels, processed, and tested as shown in Example 12, above. The crock meter abrasion resistance (cycles) obtained is shown in the Table IV below.

TABLE IV

| Fillers | Cycles |
| --- | --- |
| Nylon-11 micropowder | 10,100 |
| 2% divinylbenzene crosslinked polystyrene (200–400 mesh) | 14,600 |
| TEFLON (duPont, fluorocarbon resin) | 6,300 |
| Degussa-TS-/100 (Silica) | 11,100 |
| "Cabosil" N-70-TS (Silica) | 4,200 |
| Raven 450 (carbon black) | 5,400 |

EXAMPLE 14

Mixtures of 2 grams of N-chlorinated nylon 6/10, 48 g of methylene chloride and 0.2 g each of polysiloxanes: a glycidoxypropyl-branched-T-structure-trimethylsiloxy terminated polydimethylsiloxane (Petrarch Systems, Inc. PS-404), aminoalkyl-branched-T-structure trimethyl siloxy terminated polydimethylsiloxane (Petrarch Systems, Inc. PS-054), acetoxy-terminated polydimethylsiloxane (Petrarch Systems, Inc. PS-363.5) and polymethylphenyl-diphenyl siloxane copolymer (Petrarch Systems, Inc. PS-162) were each applied to uncoated and cured EPDM rubber glass run channels, processed and tested according to Example 12, above. The crock meter abrasion resistance obtained is shown in Table V below:

TABLE V

| Silicone oil | Cycles |
| --- | --- |
| Glycidoxypropyl-T-structure branched (PS-404) | 3,000 |
| Aminoalkyl-T-structure branched (PS-054) | 647 |
| Acetoxy-terminated (PS-363.5) | 9,737 |
| Polymethylphenyl diphenylsiloxane copolymer (PS-162) | 44 |

EXAMPLE 15

Mixtures of 2 grams of N-chlorinated nylon 6/12, 0.2 g of trimethylsiloxy-terminated polydimethyl siloxane (300,000 centistokes), 48 g. of methylene chloride (as solvent), and different levels of 2%-divinylbenzene-crosslinked polystyrene (200–400 mesh) were applied to uncoated and cured EPDM rubber glass run channels, processed and tested as shown in Example 12, above. The crock meter abrasion resistance obtained is shown in Table VI, below:

TABLE VI

| 2%-divinylbenzene-crosslinked polystyrene level (% by weight) of N—chlorinated nylon 6/12 | Cycles |
| --- | --- |
| 0 | 8,600 |
| 5 | 17,900 |
| 10 | 25,000 |
| 15 | 25,000 |
| 20 | 25,000 |
| 30 | 15,000 |
| 50 | 8,500 |

We claim:

1. A composition useful as a coating comprising a solution in an organic solvent of (I) at least one chlorinated or brominated thermoplastic amide group containing polymer or resin in which the (—NH—) units have been changed to (—NBr—) or (—NCl—) units, (II) dispersed or dissolved in said solution at least one linear or branched siloxane or silicone compound which may be terminally saturated or terminally unsaturated having a viscosity of from about 25 to 2,750,000, or from about 50 to 300,000, centistokes at 25° C. and, optionally dispersed in said solution, (III) at least one finely divided material selected from the group consisting of inorganic and organic fillers and pigments having a particle size of from about 0.1 to 100, preferably from about 2 to 70, microns, (I) being used in an amount of about 100 parts by weight, (II) being used in an amount of from 5 to 80 parts by weight and (III) being used in an amount of from 5 to 60 parts by weight.

2. A composition according to claim 1 where said thermoplastic polymer or resin is selected from the group consisting of polyacrylamides, polyamideimides, polysulfonamides, polyurethanes, polyureas, polyurethane-ureas and polyamides and mixtures of the same.

3. A composition according to claim 2 where said thermoplastic polymer or resin is a nylon and where said siloxane is at least one material selected from the group consisting of trimethylsiloxy-terminated polydimethylsiloxane and dimethylvinylsiloxy-terminated polydimethylsiloxane.

4. A composition according to claim 3 where said nylon is nylon 6.

5. A composition according to claim 3 where said nylon is nylon 6,6.

6. A composition according to claim 3 where said nylon is nylon 11.

7. A composition according to claim 3 where said nylon is nylon 12.

8. The method which comprises coating the surface of a cellular or solid cured rubbery hydrocarbon polymer with a composition comprising a solution in an organic solvent of (I) at least one chlorinated or brominated thermoplastic amide group containing polymer or resin in which the (—NH—) units have been changed to (13 NBr—) or (—NCl—) units, (II) dispersed or dissolved in said solution at least one linear or branched siloxane or silicone compound which may be terminally saturated or terminally unsaturated having a viscosity of from about 25 to 2,750,000, or from about 50 to 300,000, centistokes at 25° C. and optionally dispersed in said solution, (III) at least one finely divided material selected from the group consisting of inorganic and organic fillers and pigments having a particle size of from about 0.1 to 100, preferably from about 2 to 70, microns,
(I) being used in an amount of about 100 parts by weight,
(II) being used in an amount of from 5 to 80 parts by weight and
(III) being used in an amount of from 5 to 60 parts by weight, drying and irradiating with ultraviolet light or heating the coated rubbery polymer for a period time and at a temperature sufficient to convert the (—NBr—) or (—NCl—) units to (—NH—) units to form the original amide, (—CONH—), groups of the thermoplastic polymer or resin and to form an adherent and abrasion resistant coating on the rubbery polymer.

9. The method according to claim 8 where said thermoplastic amide group containing polymer or resin is selected from the group consisting of polyacrylamides, polyamide-imides, polysulfonamides, polyurethanes, polyureas, polyurethane-ureas and polyamides and mixtures of the same.

10. The method according to claim 9 where said rubbery hydrocarbon polymer is an ethylene-propylenenon-conjugated diene terpolymer.

11. The method according to claim 10 where said thermoplastic amide group containing polymer or resin is a nylon and where said siloxane is at least one material selected from the group consisting of trimethylsiloxy-terminated polydimethylsiloxane and dimethylvinyl-siloxy-terminated polydimethylsiloxane.

12. The method according to claim 11 where said nylon is nylon 6.

13. The method according to claim 11 where said nylon is nylon 6,6.

14. The method according to claim 11 where said nylon is nylon 11.

15. The method according to claim 11 where said nylon is nylon 12.

16. The product produced by the method of claim 11.

17. The product produced by the method of claim 12.

18. The product produced by the method of claim 13.

19. The product produced by the method of claim 14.

20. The product produced by the method of claim 15.

21. An automotive weatherstrip or glass run channel comprising a cured substrate of a rubbery ethylene-propylene-non conjugated diene terpolymer having an adherent and abrasion resistant coating on the surface of said terpolymer produced by the method of claim 11.

* * * * *